(12) United States Patent
Park et al.

(10) Patent No.: US 8,267,623 B2
(45) Date of Patent: Sep. 18, 2012

(54) CUTTING INSERT HAVING A CORNER RECESS

(75) Inventors: Hong Sik Park, Daegu (KR); Bo Ra Na, Daegu (KR)

(73) Assignee: TaeguTec, Ltd., Daegu (KR)

( * ) Notice: Subject to any disclaimer, the term of this patent is extended or adjusted under 35 U.S.C. 154(b) by 163 days.

(21) Appl. No.: 12/667,629

(22) PCT Filed: May 6, 2008

(86) PCT No.: PCT/KR2008/002530
§ 371 (c)(1),
(2), (4) Date: Nov. 30, 2010

(87) PCT Pub. No.: WO2009/005218
PCT Pub. Date: Jan. 8, 2009

(65) Prior Publication Data
US 2011/0070040 A1    Mar. 24, 2011

(30) Foreign Application Priority Data
Jul. 5, 2007 (KR) .......................... 10-2007-0067640

(51) Int. Cl.
*B23B 27/22* (2006.01)
*B23B 27/00* (2006.01)
(52) U.S. Cl. ........................................ 407/113; 407/114
(58) Field of Classification Search .................. 407/113, 407/114, 115, 116
See application file for complete search history.

(56) References Cited

U.S. PATENT DOCUMENTS

| | | | | |
|---|---|---|---|---|
| 5,476,346 A | * | 12/1995 | Lundstrom | 407/114 |
| 5,743,681 A | * | 4/1998 | Wiman et al. | 407/114 |
| 6,065,907 A | * | 5/2000 | Ghosh et al. | 407/114 |
| 2005/0019111 A1 | * | 1/2005 | Kitagawa et al. | 407/113 |
| 2005/0123367 A1 | | 6/2005 | Gati | |

FOREIGN PATENT DOCUMENTS

| | | |
|---|---|---|
| JP | 10-118810 | 5/1998 |
| JP | 2004-016150 | 4/2004 |

OTHER PUBLICATIONS

International Search Report in PCT/KR2008/002530, dated Oct. 24, 2008.
Written Opinion in PCT/KR2008/002530, dated Oct. 24, 2008.

* cited by examiner

*Primary Examiner* — Will Fridie, Jr.
(74) *Attorney, Agent, or Firm* — Womble Carlyle

(57) ABSTRACT

A cutting insert for a machining tool has a structure capable of effectively controlling chips generated on a work-piece. The cutting insert includes an upper surface, a lower surface, a plurality of side surfaces connecting the upper surface and the lower surface and a central hole formed at a central portion thereof. In the cutting insert, a seating surface is formed on a highest portion of the upper surface, a plurality of side cutting edge portions are formed at border portions of the upper surface and the side surfaces. Each side cutting edge portion has a side cutting edge formed at an upper end thereof and a corner cutting edge portion is formed at an intersection of two adjacent side cutting edge portions. The corner cutting edge portion has a cutting edge formed at a front end thereof, a land portion, a downward inclined surface, a corner bottom surface, a first upward inclined surface, a first protrusion, a second upward inclined surface, a second protrusion, an upward grooved surface and the seating surface sequentially formed along a diagonal line directed from the corner cutting edge toward the central hole. The corner bottom surface has the smallest height along the diagonal line.

15 Claims, 5 Drawing Sheets

[Fig. 1]
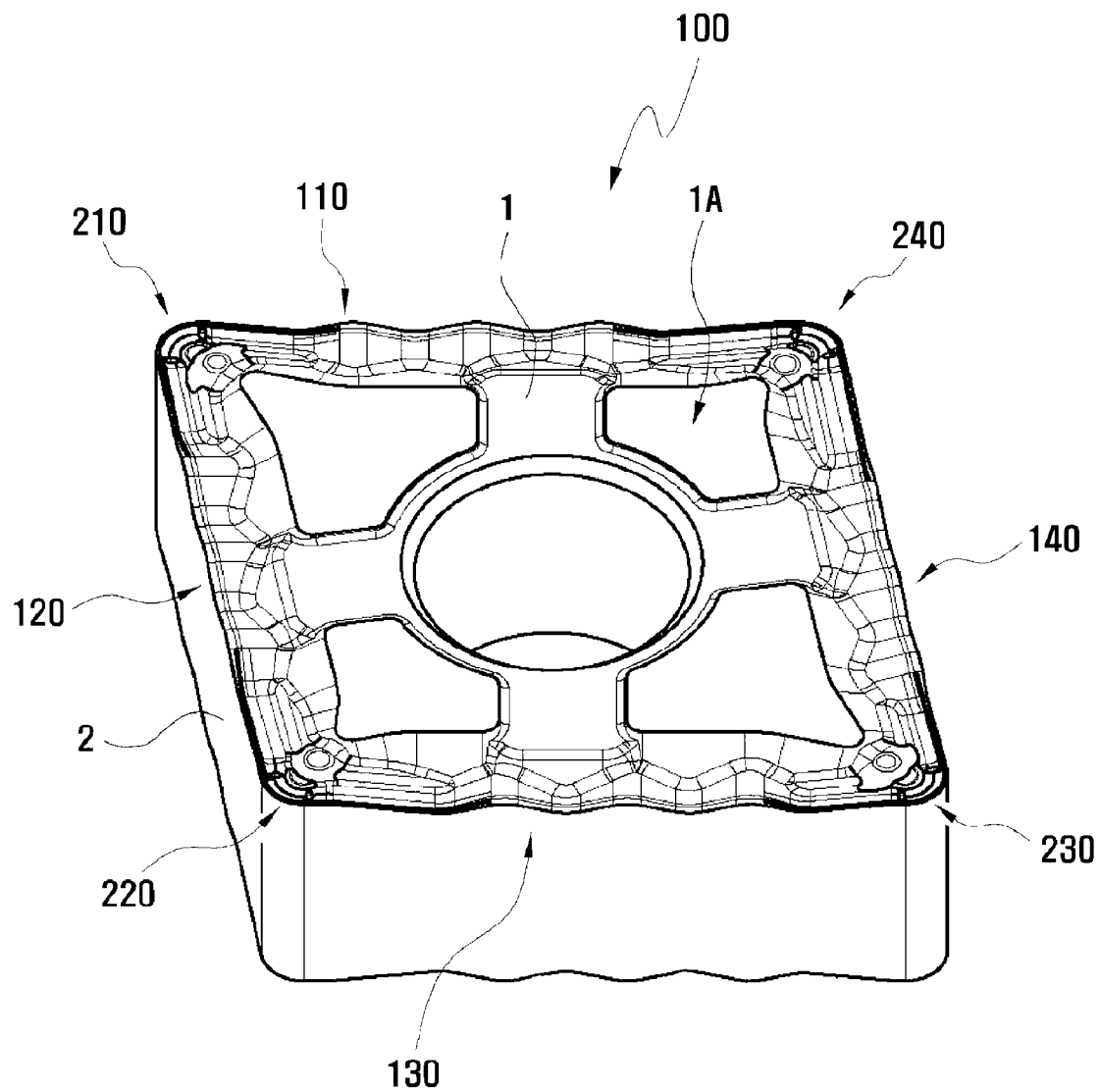

[Fig. 2]
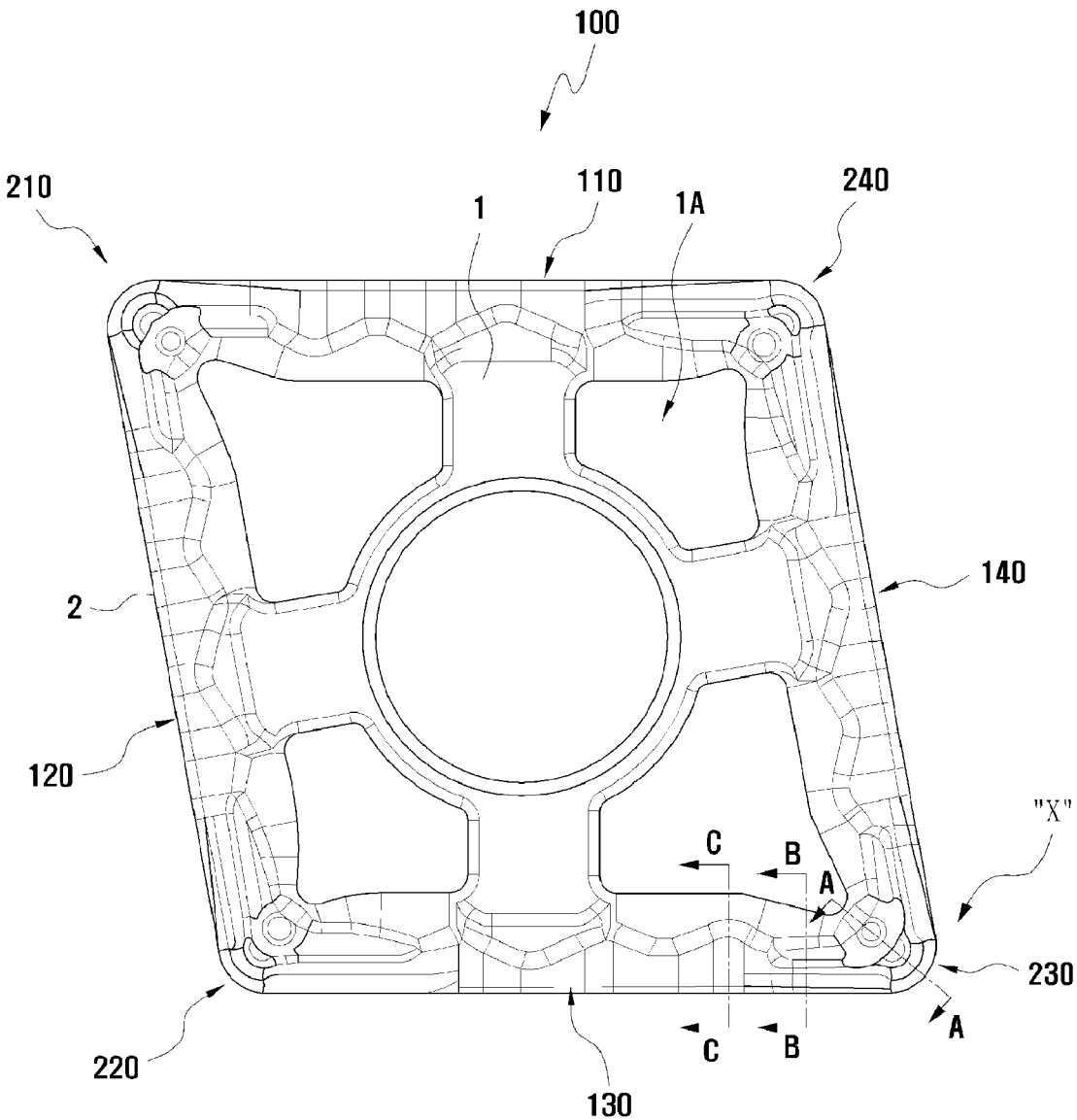

[Fig. 3]
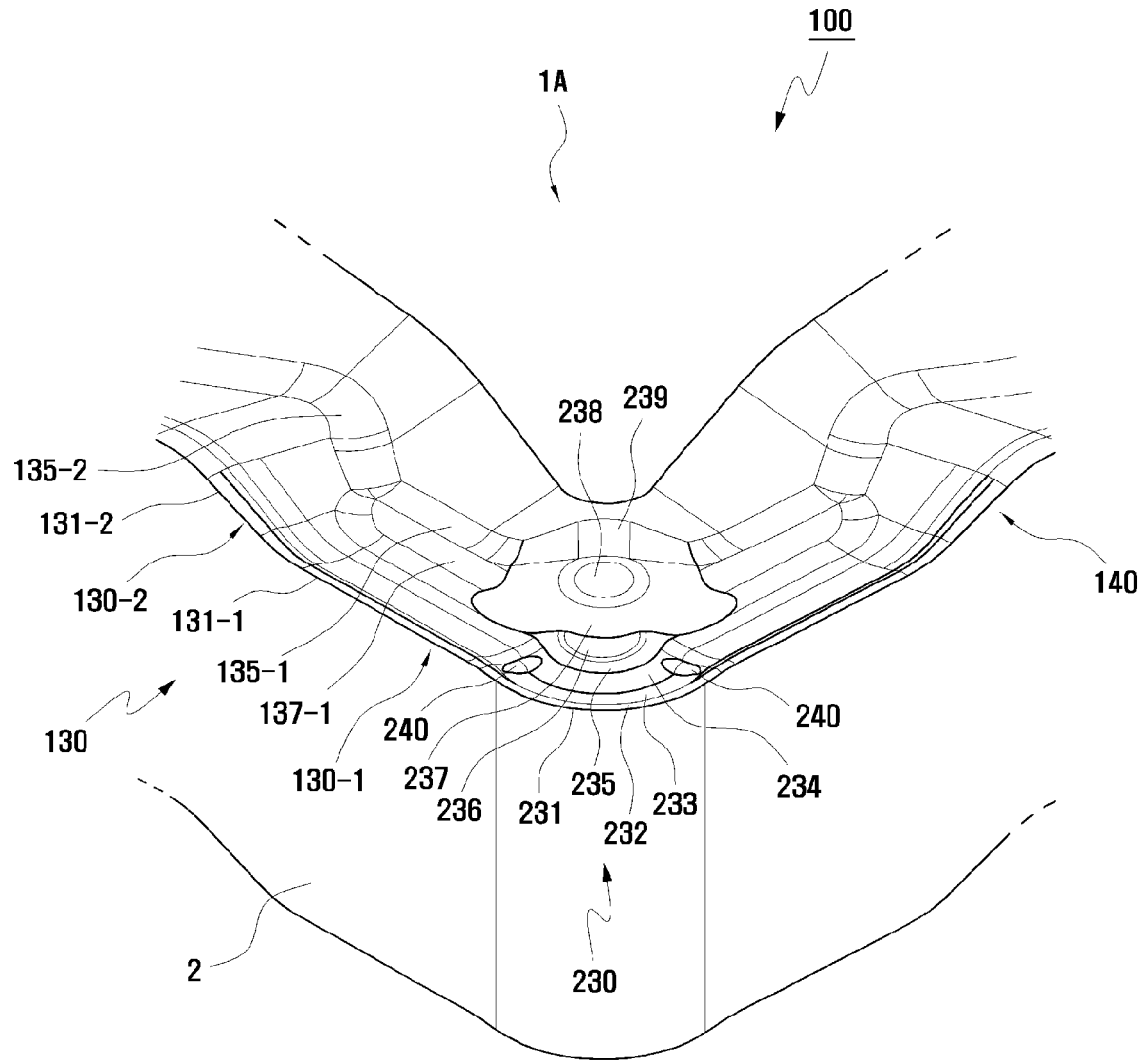
[Fig. 4]
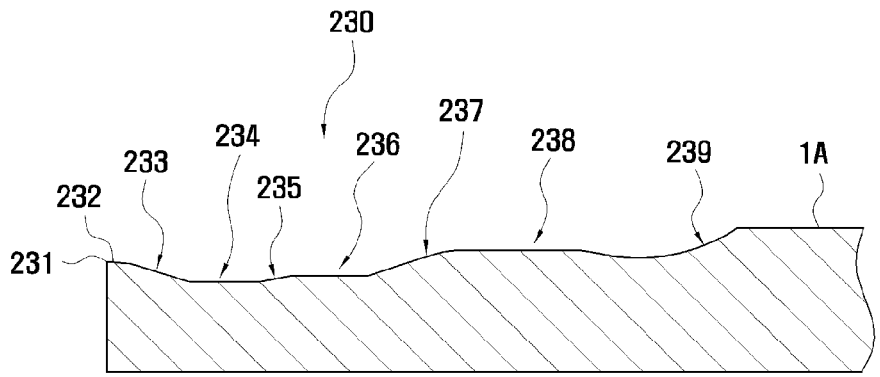

[Fig. 5]
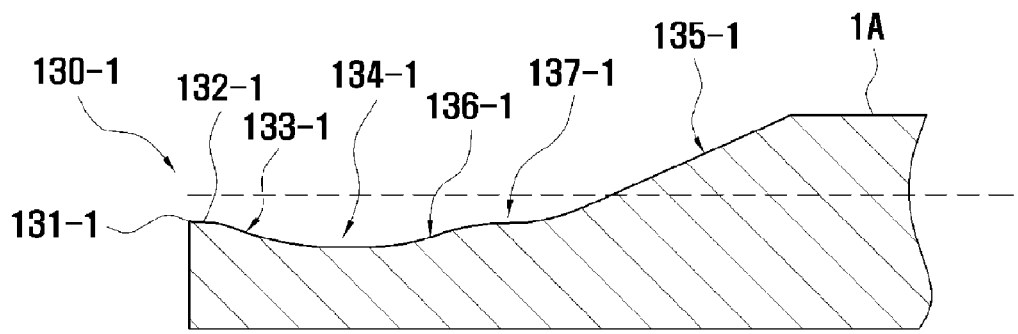
[Fig. 6]
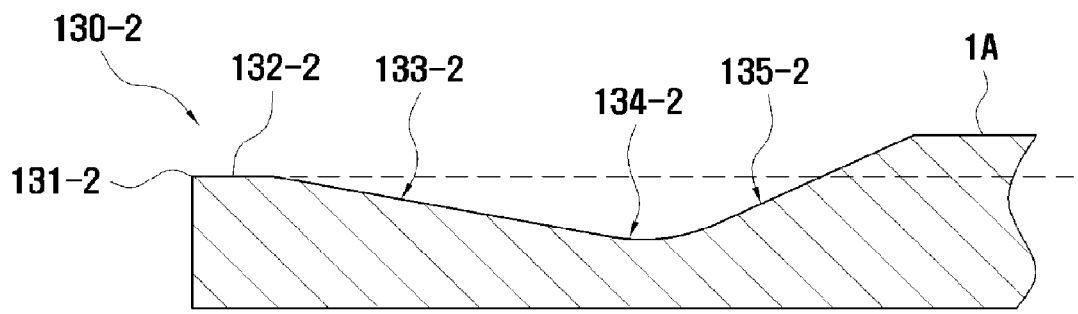
[Fig. 7]
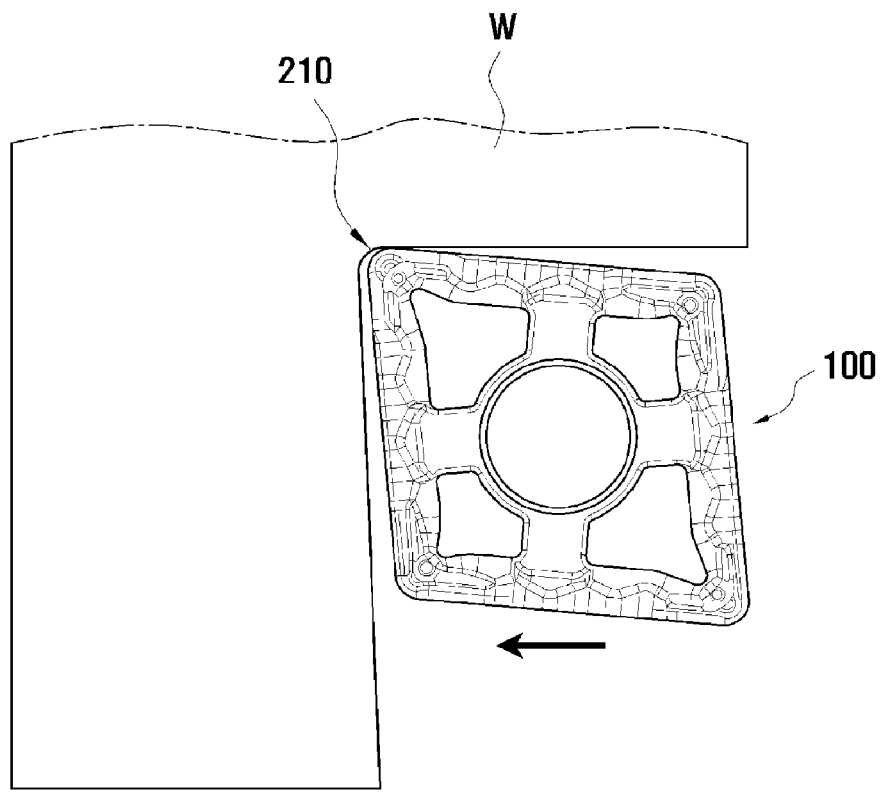

[Fig. 8]
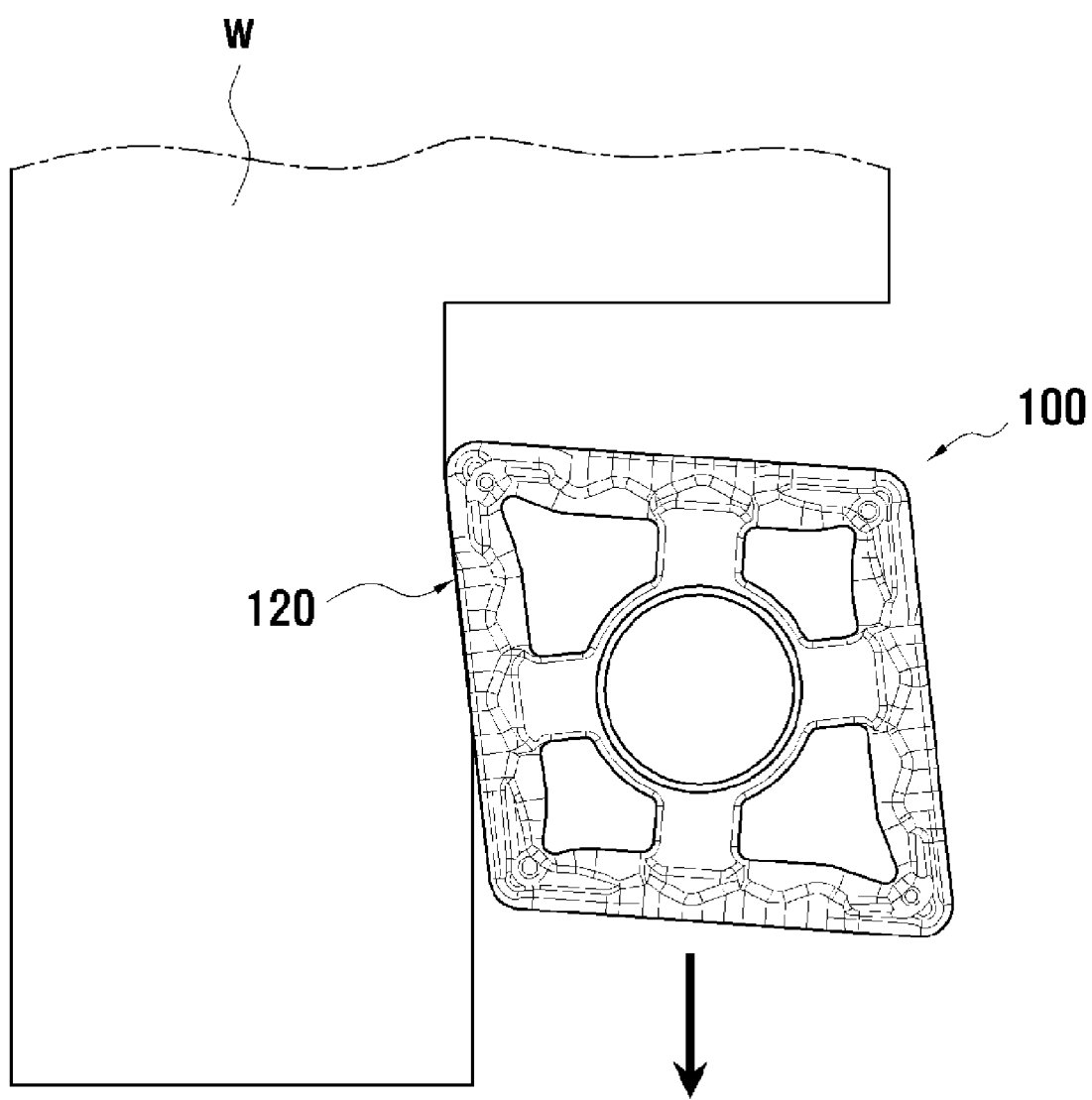

CUTTING INSERT HAVING A CORNER RECESS

TECHNICAL FIELD

The present invention relates to a cutting insert, more particularly, to a cutting insert having a structure being capable of effectively controlling chips generated on a work-piece at the time of performing a cutting process for the work-piece.

BACKGROUND ART

In general, a machining tool is used in the field of cutting machining such as drilling, milling, and turning. Within the fields of drilling and milling, a tool having a rotary character is useful for machining a fixed and movable work-piece.

On the contrary, a machining tool for turning machining is fixed and has the purpose of machining work-piece which is rotating. In general, the machining tool comprises a tool holder and a cutting insert fixed to a mounting surface of the tool holder through a clamping means and contacted with the work-piece.

When a turning machining in which the machining tool is utilized is performed, chips generated on the work-piece by the cutting insert should be separated and removed naturally from the rotating work-piece. If the chips exist between the cutting insert and the work-piece, a surface of the rotating work-piece is influenced by the chips. The above phenomenon is described in more detail as follows.

The effective removal of the generated chips to a large extent depends on the design of cutting insert for effectively controlling the chip. It is preferable that the generated chips are diverted from the cutting area by being deformed, split or broken into relatively short chips with minimal energy consumption and with effective heat dissipation.

To this end, a cutting insert with suitably formed depressions or grooves or a cutting insert with protrusions near the cutting edge which is designed to deform, split or break the chip with minimal energy consumption and with effective heat dissipation is provided.

Due to the specific shape of the chip forming groove and a smooth transition between different portions of the chip forming groove, however, an effective control of chip orientation depends on the positioning of the cutting insert in the tool.

Under the above conditions, the chips formed by the cutting edge will be deflected in the direction toward, rather than away from the work-piece due to the cutting insert positioned in the tool at negative rake angles. Consequently, the work-piece and the tool may be damaged by the chips.

In particular, to machine mild steel generating chips which are difficult to control (that is, not bent easily), the serrated cutting insert is required. In addition, the cutting insert which can remove the chips easily and minimize a cutting load under the machining conditions of a low feed rate and a high depth of cut is required.

SUMMARY OF THE INVENTION

Accordingly, the present invention is conceived to solve the aforementioned problems caused by a structure of the cutting insert of the machining tool, an object of the present invention is to provide a cutting insert for a machining tool having a structure being capable of controlling effectively chips generated on a work-piece.

A cutting insert according to the present invention includes an upper surface, a lower surface, a plurality of side surfaces connecting the upper surface and the lower surface and a central hole formed at a central portion thereof, the side surfaces lying on an imaginary polygon. In the cutting insert, a flat seating surface is formed on a highest portion of the upper surface, a plurality of side cutting edge portions are formed at border portions of the upper surface and the side surfaces, each side cutting edge portion has a side cutting edge formed at an upper end thereof, a corner cutting edge portion is formed at a border portion of two adjacent side cutting edge portions, the corner cutting edge portion has a cutting edge formed at a front end thereof, a land portion, a downward inclined surface, a corner bottom surface, a first upward inclined surface, a first protrusion, a second upward inclined surface, a second protrusion, an upward grooved surface and the seating surface are sequentially formed along a diagonal line directed from the corner cutting edge toward the central hole, and the corner bottom surface has the smallest height along the diagonal line.

Here, the first protrusion has a height smaller than that of the corner cutting edge and the second protrusion has a height larger than that of the corner cutting edge.

In the cutting insert according to the present invention, the side cutting edge repeatedly descends and ascends starting from the corner cutting edge so that the side cutting edge has a serrated shape in which raised portions and depressed portions are alternatingly disposed.

The raised portions and the depressed portions of the side cutting edge are extended from the side cutting edge toward an inside, and followed by a land portion, a downward inclined surface, a side bottom surface and an upward grooved surface disposed sequentially on the side cutting edge portion.

The depressed portion adjacent to the corner cutting edge has an upward inclined surface and an extended protrusion disposed between the side bottom surface and the upward grooved surface, and the extended protrusion extends from the second protrusion in parallel to the side cutting edge and has a height smaller than that of the second protrusion.

A corner ridge is formed at a border of the corner cutting edge and the depressed portion adjacent to the corner cutting edge, the corner ridge has the height equal to or smaller than that of the side cutting edge and higher than that of the corner bottom surface.

The cutting insert according to the present invention having the structure and function as described above can control the chips effectively and minimize a cutting load under the machining conditions of a low feed rate and a high depth of cut.

In addition, the thin chip generated on a cutting surface of the work-piece which is contacted with the side cutting edge portion can be wrinkled due to the side cutting edge portion having the serration shape so that the wrinkled chip can be broken easily.

BRIEF DESCRIPTION OF THE DRAWINGS

The above and other features and advantages of the present invention will become readily apparent by reference to the following detailed description when considered in conjunction with the accompanying drawings wherein:

FIG. 1 and FIG. 2 are perspective view and plane view of a cutting insert according to the present invention;

FIG. 3 is a partial perspective view of one corner cutting edge portion;

FIG. 4 is a sectional view taken along the line A-A in FIG. 3;

FIG. 5 is a sectional view taken along the line B-B in FIG. 3;

FIG. 6 is a sectional view taken along the line C-C in FIG. 3;

FIG. 7 is a view showing a state where a work-piece is cut through a corner cutting edge portion of a cutting insert according to the present invention; and FIG. 8 is a view showing a state where a work-piece is cut through a side cutting edge portion of a cutting insert according to the present invention.

DETAILED DESCRIPTION

Hereinafter, the present invention is described in detail with reference with the accompanying drawings.

FIG. 1 and FIG. 2 are perspective view and plane view of a cutting insert according to the present invention and show a cutting insert having a structure being capable of controlling effectively chips generated on a work-piece.

A cutting insert 100 includes an upper surface 1, a lower surface and side surfaces 2, each of four (4) side cutting edge portions 110, 120, 130 and 140 is formed at an intersection between the upper surface 1 (or the lower surface) and the side surface 2. In addition, each of four (4) edge corner portions 210, 220, 230 and 240 is formed at an intersection between two adjacent side edge portions. A central hole is formed at the central portion of the insert.

As an example, the cutting insert 100 is an equilateral parallelogram member having a certain angled diamond shape. That is, as shown in FIG. 2, one side surface 2 of the cutting insert 100 has a certain angle (acute angle) with respect to an adjacent side surface.

The upper surface 1 and the lower surface of the cutting insert 100 are formed with a substantial plane seating surface 1A. This seating surface 1A is preferably protruded above the corner cutting edge portions 210, 220, 230 and 240 and is located at the highest level. The seating surface 1A serves as an insert supporting surface when the cutting insert 100 is mounted on the cutting tool.

Detailed structure of the side cutting edge portions 110, 120, 130 and 140 and the corner cutting edge portions 210, 220, 230 and 240 of the cutting insert 100 constructed as described above is described below. In the description below, for thesakeof convenience, one side cutting edge portion 130 and one corner cutting edge portion 230 are illustrated as an example.

Corner Cutting Edge Portion

The corner cutting edge portions 210, 220, 230 and 240 of the cutting insert 100 according to the present invention have the same configuration. FIG. 3 is a partial perspective view of X part in FIG. 2 and shows a structure of one corner cutting edge portion 230.

And, FIG. 4 is a sectional view taken along the line A-A in FIG. 2, and FIG. 3 and shows a section of one corner cutting edge portion 230.

The corner cutting edge portion 230 formed at an intersection portion of two adjacent side cutting edge portions 130 and 140 has a corner cutting edge 231 formed at a front end thereof. A land portion 232 and a corner bottom surface 234 having a certain width are sequentially formed on an upper surface of an inside of the corner cutting edge 231. The height of the corner bottom surface 234 is smaller than that of the corner cutting edge 231, and the land portion 232 and the corner bottom surface 234 are connected by a downward inclined surface 233 formed therebetween.

A first protrusion 236 having a certain width is formed at an inner side of the corner bottom surface 234 toward the insert central hole. A height of the first protrusion 236 is larger than that of the corner bottom surface 234, but is smaller than that of the corner cutting edge 231. On the other hand, the first protrusion 236 and the corner bottom surface 234 are connected by a first upward inclined surface 235.

A second protrusion 238 having a certain width is formed at an inward side of the first protrusion 236. A height of the second protrusion 236 is larger than that of the corner cutting edge 231. A second upward inclined surface 237 connects the first protrusion 236 and the second protrusion 238. An upward grooved surface 239 connected to the seating surface 1A is formed on at an inward side of the second protrusion 238.

Here, the land portion 232, the downward inclined surface 233, the corner bottom surface 234, the first upward inclined surface 235, the first protrusion 236, the second upward inclined surface 237, the second protrusion 238 and the upward grooved surface 239 are disposed sequentially on a diagonal line crossing the corner cutting edge 231 and a center portion of the cutting insert 100.

Side Cutting Edge Portion

The side cutting edge portion 130 formed at an intersection between the upper surface 1 and the side surface 2 has a serrated shape formed along the entire length thereof.

That is, raised portions and depressed portions are alternatingly formed on an upper surface of the side cutting edge portion 130 along the entire length. The serration of the side cutting edge is obtained by the raised portions and the depressed portions formed on the upper side of the side cutting edge portion 130.

A detail configuration of the above side cutting edge portion 130 is described as follows.

FIG. 5 is a sectional view taken along the line B-B in FIG. 2 and shows a depressed portion formed on the side cutting edge portion 130. And, FIG. 6 is a sectional view taken along the line C-C in FIG. 2 and shows a raised portion formed on the side cutting edge portion.

The side cutting edge descends and ascends repeatedly starting from the corner cutting edge 231, and so the side cutting edge portion 130 has a serrated shape in which depressed portions 130-1 and raised portions 130-2 are repeatedly disposed.

As shown in FIG. 5 and FIG. 6, side cutting edges 131-1, 131-2 are formed at ends of the depressed portions 130-1 and the raised portions 130-2. In the depressed portion 130-1, a land portion 132-1, a downward inclined surface 133-1, a side bottom surface 134-1 and an upward grooved surface 135-1 are disposed sequentially between the side cutting edge 131-1 and the seating surface 1A. Also, in the raised portion 130-2, a land portion 132-2, a downward inclined surface 133-2, a side bottom surface 134-2 and an upward grooved surface 135-2 are disposed sequentially between the side cutting edge 131-2 and the seating surface 1A.

Here, a width of the side bottom surface 134-2 of the raised portion 130-2 is larger than that of the side bottom surface 134-1 of the depressed portion 130-1. In addition, the side bottom surface 134-2 of the raised portion 130-2 is farther from its associated side cutting edge 131-2 than the side bottom surface 134-1 of the depressed portion 130-1 is from its own associated side cutting edge 131-1. Also, as shown in FIG. 5 and FIG. 6, a height of the side cutting edge 131-1 of the depressed portion 130-1 is smaller than that of the corner cutting edge (indicated by the dotted horizontal line in FIG. 5) and a height of the side cutting edge 131-2 of the raised portion 130-2 is equal to that of the corner cutting edge (indicated by the dotted horizontal line in FIG. 6).

The depressed portion 130-1 adjacent to the corner cutting edge 231 further comprises an upward inclined surface 136-1 and an extended protrusion 137-1 disposed between the side bottom surface 134-1 and the upward grooved surface 135-1. Here, the extended protrusion 137-1 extends from the second protrusion 238 of the corner cutting edge portion 230 in parallel to the side cutting edge 131-1. However, the height of the extended protrusion 137-1 is smaller than that of the second protrusion 238.

On the other hand, corner ridges 240 are formed at borders of the corner cutting edge 231 and the depressed portion 130-1 adjacent to the corner cutting edge 231. Here, each corner ridge 240 is extended from the side cutting edge 131-1 toward an inside and has a height equal to or smaller than that of the side cutting edge 131-1 of the depressed portion 130-1 and higher than that of the corner bottom surface 234.

Here, it is preferable that corner ridge 240 extends toward the first protrusion 236 of the corner cutting edge portion 230 but falls short of the first protrusion 236 so that a gap is formed between the corner ridge 240 and the first protrusion 236.

Below, function of the cutting insert according to the present invention as described above is illustrated with reference to the drawings.

On the corner cutting edge portion (for example, 230 in FIG. 3), a close-shaped recess is formed by the corner cutting edge 231-1, the downward inclined surface 233 adjacent to the corner cutting edge, the corner bottom surface 234, the first protrusion 236 extending toward a center of the cutting insert along the diagonal line, and the corner ridges 240 extended from ends of the corner cutting edge 231-1 toward the first protrusion 236. Due to the above structure, it is possible to control the chip efficiently and minimize a cutting load under the condition of a small depth of cut so that the life span of the cutting insert can be increased. Preferably, at this time, the first protrusion 236 has a height larger than that of the corner bottom surface 234 by 0.01 mm to 0.05 mm.

The second protrusion 238 extended in the diagonal direction of the cutting insert and having a height larger than that of the first protrusion 236 is disposed adjacently to the first protrusion 236. Accordingly, the chips which can not be controlled on the first protrusion 236 under the condition of a high depth of cut can be effectively controlled. As described above, the second protrusion 238 has a height larger than that of the corner cutting edge 231, preferably, by 0.02 mm to 0.10 mm.

The band-shaped corner ridge 240 is extended in the inward direction of the cutting insert from a point at which the corner cutting edge 231 is terminated or points around that point. These corner ridges 240 in association with the first protrusion 236 form a closed recessed area. Due to this recessed area, the chips can be effectively controlled under the condition of a small depth of cut. Also, although the chip having a somewhat long length is moved to the non-active cutting edge, it is possible to control secondarily the chip in the direction away from the active cutting edge.

The corner ridge 240 has a height equal to or larger or smaller than that of the corner cutting edge 231, preferably, by 0.05mm or less. If a height of the corner ridge 240 is excessively small, it becomes difficult to break the chip into the chip pieces with a proper length under the condition of a small depth of cut. On the contrary, if a height of the corner ridge 240 is extremely large, the chip is excessively broken to cause the generation of vibration.

Here, the corner ridge 240 is terminated at a point of the corner bottom surface 234 in front of the first protrusion 236 to form a narrow gap between the corner ridge 240 and the first protrusion 236. Due to this gap, heat of the cutting insert and chips can be effectively dissipated and a cutting load acting as a factor by which vibration is generated can be restrained to a minimum extent.

At a position spaced from the corner cutting edge 231, the extended protrusion 137-1 with a certain length is adjacent to the second protrusion 238 and extends parallel to the side cutting edge 131-1 or at an angle with respect to the side cutting edge. The extended protrusion 137-1 has a height smaller than that of the second protrusion 238 and equal to or larger than that of the side cutting edge 131-1 by approximately 0.05 mm.

Although the machining is performed at a low feed rate, it is difficult to control effectively the chips by means of only the chip control structures formed on the corner cutting edge portions 210, 220, 230 and 240 under the condition of a high depth of cut, and so the chip control structures formed on the side cutting edge portions 110, 120, 130 and 140 become more important.

Under the condition of a low feed rate, there is a need to dispose the upward grooved surfaces 135-1, 135-2 in closest proximity to the side cutting edges 131-1, 131-2. In this state, however, an excessive shear stress is generated on the chips due to a large height difference between the upward grooved surface 135-1 (or 135-2) and the side cutting edge 131-1 (or 131-2), a cutting load is increased by the shear stress to cause a generation of vibration.

Accordingly, by forming additional extended protrusions having a height equal to or similar to that of the side cutting edges 131-1, 131-2 at positions near the side cutting edges 131-1, 131-2 so as to obtain the function similar to that of the upward grooved surfaces 135-1, 135-2 but with a relatively smaller height, it is possible to control effectively the chips and minimize a cutting load under the machining conditions of a low feed rate and a high depth of cut.

FIG. 6 is a view showing a state where the work-piece W is machined by the corner cutting edge portion (for example, 210) of the cutting insert 100 having the structure as described above.

FIG. 7 is a view showing a state where an external surface of the work-piece W is cut by one side cutting edge portion (for example, 120) of the cutting insert 100 for a final cutting step after a cutting process performed by the corner cutting edge portion 210 of the cutting insert 100 as shown in FIG. 7 is completed.

The cutting insert 100 according to the present invention having the serrated side cutting edge portion as described above is effective in case of external face turning and external turning of mild steel in which the chip is not broken easily.

Although the preferred embodiment has been described with reference to the preferred embodiment thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and appended claims. In addition to variations and modifications in the component parts and/or arrangements, alternative uses will also be apparent to those skilled in the art.

The invention claimed is:

1. A cutting insert including:
   an upper surface, a lower surface, a plurality of side surfaces connecting the upper surface and the lower surface and a central hole formed at a central portion thereof, the side surfaces lying on an imaginary polygon, wherein:
   a flat seating surface is formed on a highest portion of the upper surface,
   a plurality of side cutting edge portions are formed at border portions of the upper surface and the side surfaces, each side cutting edge portion has a side cutting edge formed at an upper end thereof, a corner cutting edge portion is formed at a border portion of two adjacent side cutting edge portions, the corner cutting edge portion has a corner cutting edge formed at a front end thereof, a land portion, a downward inclined surface, a corner bottom surface, a first upward inclined surface, a first protrusion, a second upward inclined surface, a second protrusion, an upward grooved surface and the seating surface are sequentially formed along a diagonal line directed from the corner cutting edge toward the central hole, and the corner bottom surface has the smallest height along the diagonal line.

2. The cutting insert according to claim 1, wherein:
the first protrusion has a height smaller than that of the corner cutting edge, and
the second protrusion has a height larger than that of the corner cutting edge.

3. The cutting insert according to claim 1, wherein:
the side cutting edge repeatedly descends and ascends starting from the corner cutting edge so that the side cutting edge has a serrated shape in which raised portions and depressed portions are alternatingly disposed.

4. The cutting insert according to claim 3, wherein the raised portions and the depressed portions of the side cutting edge extend from the side cutting edge toward an inside of the cutting insert, and are followed by a land portion, a downward inclined surface, a side bottom surface and an upward grooved surface.

5. The cutting insert according to claim 4, wherein the side bottom surface of the raised portion has a width larger than that of the side bottom surface of the depressed portion.

6. The cutting insert according to claim 4, wherein:
the depressed portion adjacent to the corner cutting edge has an upward inclined surface and an extended protrusion disposed between the side bottom surface and the upward grooved surface, and
the extended protrusion extends from the second protrusion in parallel to the side cutting edge and has a height smaller than that of the second protrusion.

7. The cutting insert according to claim 6, wherein:
a corner ridge is formed at a border of the corner cutting edge and the depressed portion adjacent to the corner cutting edge, and
the corner ridge has a height equal to or smaller than that of the side cutting edge and higher than that of the corner bottom surface.

8. The cutting insert according to claim 7, wherein:
the corner ridge extends toward the first protrusion but falls short of the first protrusion to have a gap therebetween.

9. The cutting insert according to claim 4, wherein:
a corner ridge is formed at a border of the corner cutting edge and a depressed portion adjacent to the corner cutting edge; and
the corner ridge has a height equal to or smaller than that of the side cutting edge and higher than that of the corner bottom surface.

10. The cutting insert according to claim 9, wherein:
the corner ridge extends toward the first protrusion but falls short of the first protrusion to have a gap therebetween.

11. The cutting insert according to claim 10, wherein:
the first protrusion has a height smaller than that of the corner cutting edge, and
the second protrusion has a height larger than that of the corner cutting edge.

12. The cutting insert according to claim 4, wherein:
the side bottom surface of the raised portion is farther from its associated side cutting edge than the side bottom surface of the depressed portion is from its own associated side cutting edge.

13. The cutting insert according to claim 12, wherein:
the first protrusion has a height smaller than that of the corner cutting edge, and
the second protrusion has a height larger than that of the corner cutting edge.

14. The cutting insert according to claim 12, wherein:
the depressed portion adjacent to the corner cutting edge has an upward inclined surface and an extended protrusion disposed between the side bottom surface and the upward grooved surface;
the extended protrusion extends from the second protrusion in parallel to the side cutting edge and has a height smaller than that of the second protrusion;
a corner ridge is formed at a border of the corner cutting edge and a depressed portion adjacent to the corner cutting edge;
the corner ridge has a height equal to or smaller than that of the side cutting edge and higher than that of the corner bottom surface; and
the corner ridge extends toward the first protrusion but falls short of the first protrusion to have a gap therebetween.

15. The cutting insert according to claim 14, wherein:
the first protrusion has a height smaller than that of the corner cutting edge, and
the second protrusion has a height larger than that of the corner cutting edge.

* * * * *